2 Sheets--Sheet 1.

L. HULL.

Cutting Sheets of Rubber into Threads.

No. 5,903. Reissued June 2, 1874.

J. E. Maynadier
J. E. Knox

Boston Elastic Fabric Co
By Chas. W. Burney Pres.
Assignee of
Lucius Hull
Inventor 2 Sheets--Sheet 2.

L. HULL.

Cutting Sheets of Rubber into Threads.

No. 5,903. Reissued June 2, 1874.

J. E. Maynadier
J. E. Knox

Boston Elastic Fabric Co. by Chas. W. Burrey, Pres't } Assignees of Lorenzo Hull, Inventor

UNITED STATES PATENT OFFICE.

LIVERAS HULL, OF BOSTON, MASSACHUSETTS, ASSIGNOR TO THE BOSTON ELASTIC FABRIC COMPANY, OF SAME PLACE.

IMPROVEMENT IN CUTTING SHEETS OF RUBBER INTO THREADS.

Specification forming part of Letters Patent No. 37,446, dated January 20, 1863: reissue No. 5,903, dated June 2, 1874; application filed May 29, 1874.

*To all whom it may concern:*

Be it known that LIVERAS HULL, of Boston, in the State of Massachusetts, has made a new and useful invention having reference to the separating of a sheet of caoutchouc into narrow filaments or strips; and we, THE BOSTON ELASTIC FABRIC COMPANY, assignees of said HULL, do hereby declare the same to be fully described in the following specification, and that in the accompanying drawings making a part thereof—

Figure 1:
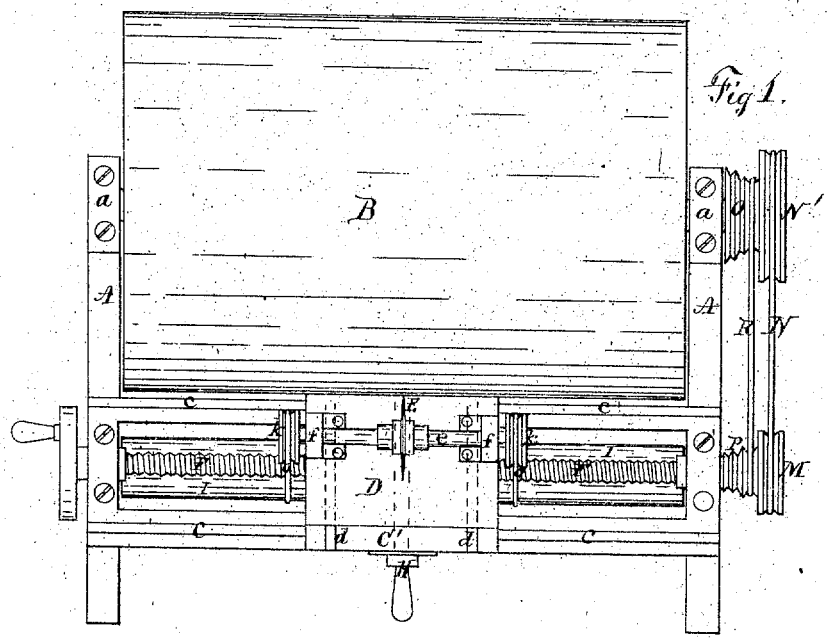
Figure 2:
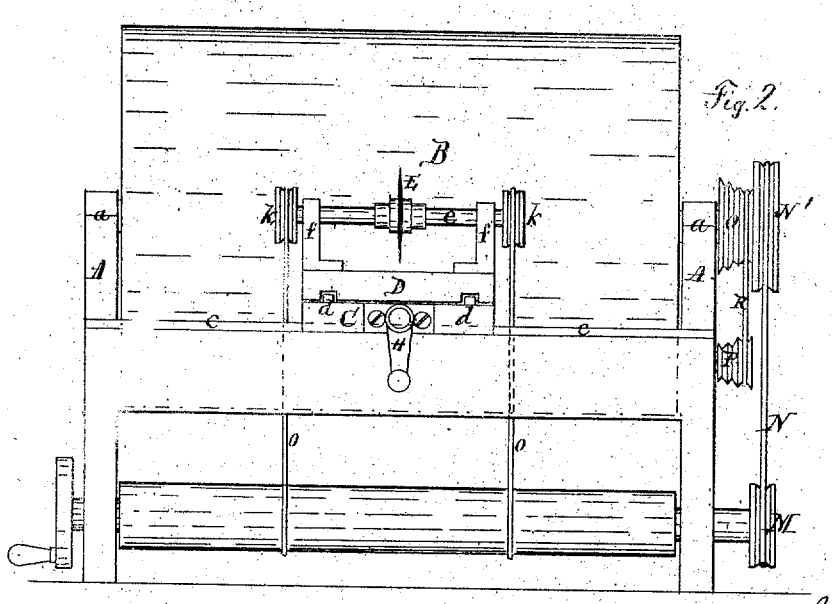
Figure 3:
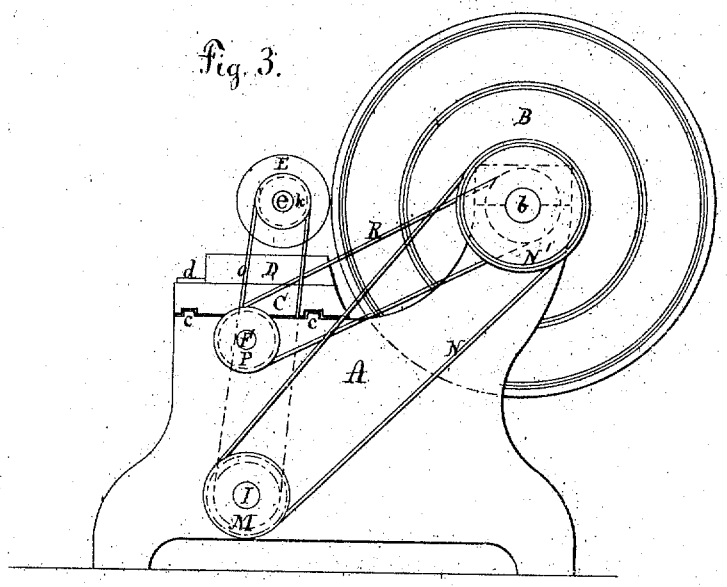
Figure 4:
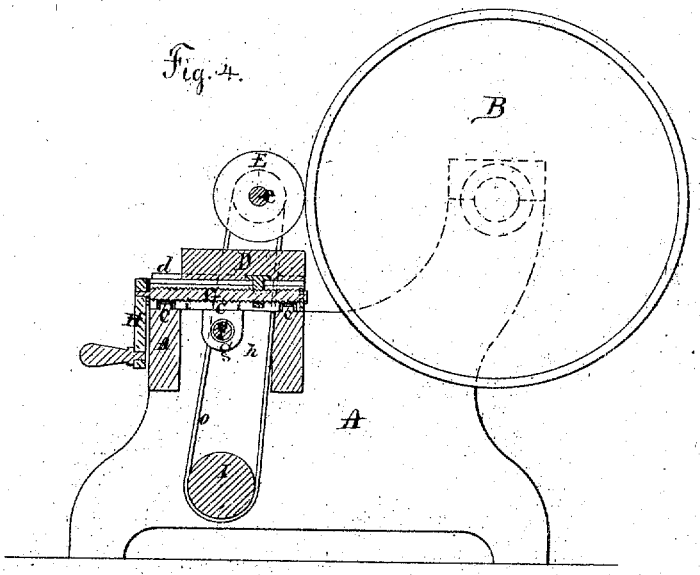

Figure 1 exhibits a top view, Fig. 2 a front elevation, Fig. 3 a side elevation, and Fig. 4 a transverse section, of a machine for cutting or separating caoutchouc in the manner herein proposed.

A sheet of caoutchouc, as usually made for being cut into threads or strips for being woven into suspenders or other elastic fabrics, is usually formed of considerable length, forty yards being no uncommon length, the width being such as may be desirable within the capacity of the machine by which the sheet may be produced. Such a sheet is, by the machine above mentioned and hereinafter described, to be separated lengthwise into a series of narrow bands or strips, all the cuts through the piece being made by one continuous cut of the cutter of the machine. Instead of employing a series of knives or rotary cutters placed parallel to each other, and arranged at small distances asunder, and running in a body over the sheet from end to end of it, but one cutter is used, and with it a cylindrical drum, or its equivalent, so arranged with respect to the cutter that the latter, provided with suitable mechanism for putting it in motion, shall be caused to travel across the cylinder or drum from end to end of it with a regular velocity, and cut in a helical path through a piece of caoutchouc when wound around the external curved surface of the drum or cylinder in a "spiral" about the said surface. By the term spiral about such surface, I mean the curve which is inherent to the mainspring of a watch.

In the drawings, A denotes the frame of the machine as supporting, in boxes *a a*, the shaft V of a cylinder or drum, B, and as provided with two parallel ways or rails, *c c*, for sustaining and guiding a carriage, C. On the upper surface of the carriage C are two ways or rails, *d d*, which are arranged to extend at right angles to the surface of the cylinder or crosswise of those on which the carriage C travels. The said rails *d d* support and guide a poppet-head or cutter-carriage, D, which carries a revolving circular knife or a cutter, E, whose shaft is arranged within standards S S, projecting upward from the said carriage D. A long screw, F, fixed in the frame A, except in being capable of being rotated, screws through a projection, *g*, extending from the under side of the carriage C. There is also another screw, G, arranged within the carriage C, and so fixed therein as to be stationary with respect to such carriage, except in being capable of being revolved by a crank, H. This latter screw screws through another projection, N, which extends downward from the cutter-carriage D and into a groove, *i*, which is made in the carriage C. A long rotary driving-drum, I, is arranged within the frame A and underneath the screw F, as shown in the drawings. Two endless bands, *o o*, go around the said drum, and two grooved pulleys, *k k*, fixed on the rotary cutter-shaft. There is a pulley, M, on the end of the shaft of the driving-drum. An endless band, N, goes around the pulley, and another pulley, N, fixed on the shaft of the main drum B. Furthermore, there is a cone-pulley, O, on the main drum-shaft, and there is also another such cone-pulley, P, on the journal of the screw F. An endless band, R, runs around the two cone-pulleys.

From the above it will be seen that when the driving-drum is put into revolution, not only will the main drum and the rotary cutter be revolved, but the latter will have a uniform lateral movement imparted to it in a direction parallel to the axis of the main drum.

Preparatory to a sheet of caoutchouc being reduced to strips by the said machine, it is to be carried around the curved surface of the main drum, and to be suitably affixed thereto by cement or other means. As each strip, as usually made for being converted into strips for elastic webbing, would be several times longer than the circumference of the main drum, it is to be wound about the drum on a watch-mainspring curve or spiral. After being so wound, the knife or rotary cutter is to be forced into the strip so as to cut at once entirely through all the layers of caoutchouc, and when the machine may be put in action, although the path cut by the rotary cutter will be a helix extending around the main drum from end to end, it will be found afterward, or when the piece of caoutchouc may have been removed from the drum, that such piece will be cut lengthwise from end to end of it in a series of parallel strips.

We do not claim, as the invention of said HULL, the machine above described; nor do we claim all modes of cutting a sheet into threads; but What we do claim, as the invention of said HULL, is—

The improved mode of manufacture above described, consisting in cutting the sheet into a series of threads by a continuous cut of one cutter, as above explained.

BOSTON ELASTIC FABRIC CO.,
By CHAS. McBURNEY, *President.*

Witnesses:
W. H. GLEASON,
C. VAN BRUNT.